May 4, 1926.

C. S. BRAGG ET AL

POWER ACTUATOR

Filed Nov. 25, 1925

Caleb S. Bragg
Victor W. Kliesrath
Inventors
By their Attorney
Louis Prevost Whitaker Patented May 4, 1926.

1,583,117

UNITED STATES PATENT OFFICE.

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK.

POWER ACTUATOR.

Application filed November 25, 1925. Serial No. 71,269.

*To all whom it may concern:*

Be it known that we, CALEB S. BRAGG, a citizen of the United States, residing at Palm Beach, in the county of Palm Beach and State of Florida, and VICTOR W. KLIESRATH, a citizen of the United States, residing at Port Washington, in the county of Nassau and State of New York, have invented certain new and useful Improvements in Power Actuators; and we do hereby declare the following to be a full, clear, and exact description of the invention, such as will enable others skilled in the art to which it appertains to make and use the same.

Our invention consists in the novel features hereinafter described, reference being had to the accompanying drawings, which illustrate one embodiment of the same, selected by us for purposes of illustration, and the said invention is fully disclosed in the following description and claims.

Our present invention consists in a novel, single acting, power actuator, especially adapted for use in connection with automotive vehicles operating on land, in or upon the water, or in the air, and operated by atmospheric air or other higher pressure fluid working against suction, most conveniently afforded by a connection with the suction passage of the internal combustion engine employed for the propulsion of the vehicle, and most conveniently by a connection with the intake manifold thereof. Our actuator is particularly desirable for use in the application of brake mechanism of automotive vehicles operated on land, such as trucks, busses, trailers and the like.

Due to the relatively low pressures under which these actuators work (about 20 inches of mercury) or the equivalent of approximately nine pounds of pressure per square inch, these actuators, which comprise a cylinder, closed at both ends, and a piston working in the cylinder, are required to be of such large size that where it is necessary to exhaust the air from the large space within the cylinder forward of the piston, and from a sufficiently large pipe to permit the passage of this air in sufficient quantities to permit a satisfactory application of the brakes, or the operation of other parts to be operated, the air so exhausted and delivered into the manifold would stall the motor if idling, and thereby shut off the source of suction upon which the operation of the actuator depends.

According to our invention, we provide such a cylinder with means for connecting it on one side of the piston at all times with the source of suction (i. e. the intake manifold of the engine), and the piston is operated by admitting higher pressure fluid, as atmospheric air, to the cylinder on the opposite face of the piston to effect the movement of the piston and subsequently withdrawing this air to permit the return stroke of the piston. The piston is therefore normally maintained submerged in vacuum and the operative stroke of the piston is effected, as in applying the brakes under the full power of the apparatus, and instantaneously without delivering any material quantity of air to the intake manifold of the engine, and therefore without materially effecting the explosive mixture passing to the cylinders, so that the operation of the engine is not interfered with. The draft of the applied brakes, and the customary springs to free the frictional surfaces of the brake mechanism from contact in the "off" or released position, where the actuator is employed in connection with the brake mechanism, will be more than sufficient to return the piston to the normal or "off" position without the necessity of employing other means, in the same manner that the draught of the applied brakes of any motor vehicle returns the brake pedal to the normal or "off" position, as the piston offers only the slightest frictional resistance and does not have to displace or force out any air, as the air previously admitted to apply the brakes is withdrawn by the suction in the intake manifold. During the return movement of the piston to the normal position, under the draught of the applied brakes and retracting springs, the air previously admitted to operate the piston is withdrawn and delivered into the intake manifold under the control of restricting means, when desired, as for example, the adjustable suction valve of the valve mechanism, as will be explained later, so as not to interfere with the operation of the engine or stall it if idling. This necessarily retards slightly the return of the piston to the normal position, but is not objectionable, as the effective frictional contact of the braking surfaces will be instantly released by the draught of the applied brakes, the piston thereafter moving more slowly under the lighter pressure of the retracting springs alone.

According to our invention, the portion of the cylinder in rear of the piston is connected with the suction means, or with the atmosphere (or other source of higher pressure) by suitable valve mechanism, which may be in some instances located inside of the cylinder, as in the hub of the piston itself, or may be located entirely outside of the cylinder, as preferred. Our invention, also permits the brakes to be applied as rapidly as desired, as the air at atmospheric pressure may be admitted to the cylinder in rear of the piston as rapidly as desired, and the valve mechanism may be constructed to permit an instantaneous release of the brakes, but equalizing the pressure within the cylinder, and simultaneously, but during a longer period of time, exhausting the air previously admitted to apply the brakes, the equalization of pressures within the cylinder permitting the draft of the applied brakes to instantly release themselves and the air within the cylinder on both sides of the piston being subsequently withdrawn in such restricted quantities as will not interfere with the explosive mixture even when the throttle is fully closed and the motor idling. A salient feature of our invention is the connection of the actuator cylinder forward of the piston at all times with the suction means. The brakes may be applied with the desired rapidity and with the full force of the apparatus at any time, without withdrawing any material quantity of air from the cylinder or discharging any material quantity of air into the intake manifold. The need of storage tanks for the purpose of retarding the flow of air, exhausted by the operation of the power actuator, into the intake manifold or for the purpose of storing "power" is entirely eliminated. We also conveniently employ a check valve interposed between the suction means and the cylinder in order that the degree of rarefication normally maintained in the cylinder shall be equal to the greatest degree of rarefication produced in the intake manifold at any time between the operations of the brakes.

In carrying our invention into effect, we also preferably connect the controlling valve mechanism with an operator operated part of the foot pedal, for example, and the operator operated part is also preferably connected with the piston by means providing lost motion sufficient to effect the operation of the valve mechanism, so that the operator may add his physical power to the power exerted by the actuator to the desired extent, and may also operate the piston and the brake mechanism connected therewith in case of failure of power.

In the accompanying drawings, which illustrate several forms in which we have contemplated embodying our invention.

Figures 1, 2:
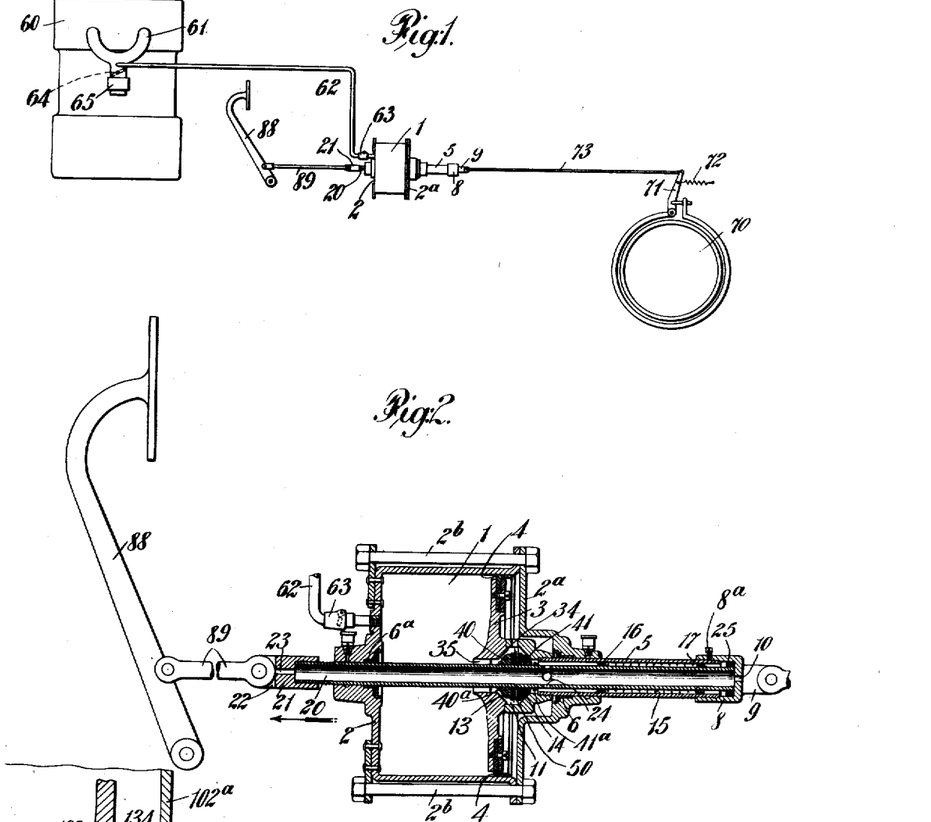
Fig. 1 represents a diagrammatic view illustrating an installation in an automotive vehicle, of our improved actuator for operating the brake mechanism thereof, and being connected with the intake manifold of the engine, for the purpose of providing the necessary suction or rarefication.
Fig. 2 is an enlarged sectional view of the actuator showing one form of valve mechanism therefor, arranged within the piston of the actuator, and operatively connected with an operator operated part, the parts being shown in normal or "off" position.
Figure 3:
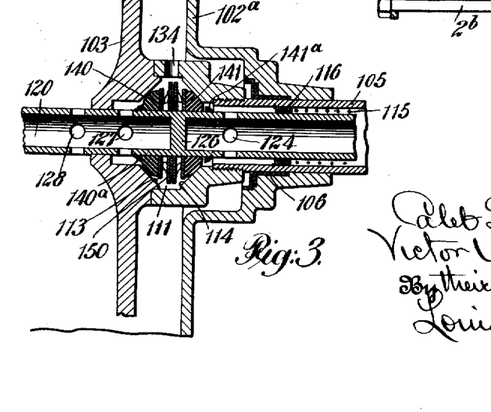
Fig. 3 is a detail of a portion of the apparatus, showing a slight modification of the valve mechanism.
Figure 4:
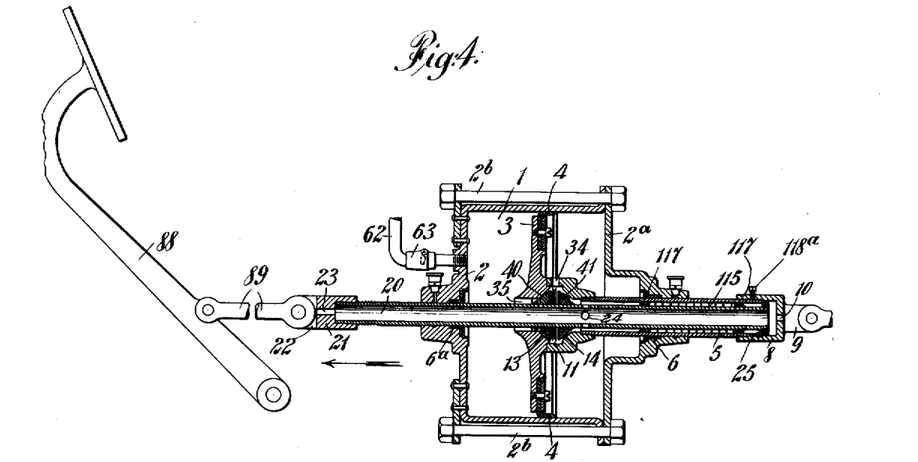
Fig. 4 is a view similar to Fig. 2, showing the valve mechanism in position to admit atmospheric air in rear of the piston, and the piston moved forward from its normal position.
Figures 5, 6:
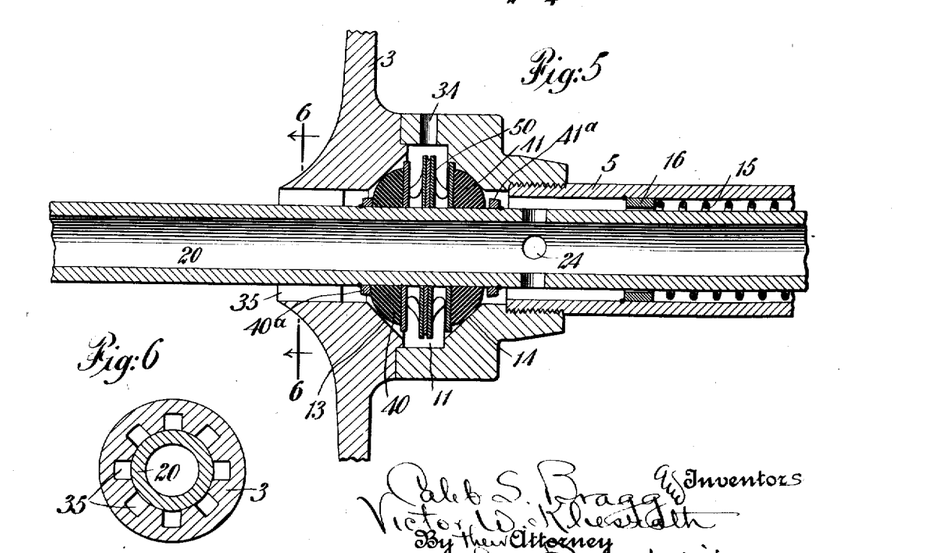
Fig. 5 is an enlarged detailed view of the valve mechanism illustrated in Figs. 2 and 4.
Fig. 6 is a section on line 6—6 of Fig. 5.

Referring to the form of our invention shown on Figs. 1, 2, 4, 5 and 6, 1, represents the actuator cylinder which is closed at both ends. This may be accomplished in various ways, but in the present instance, as shown in Figs. 2 and 4, the cylinder is conveniently made with an integral head, 2, at one end, and a detachable head, 2ª, at the other end, secured in position by bolts, 2ᵇ, or otherwise. 3 represents a single acting piston in the cylinder, provided with a gasket, 4, and a hollow piston rod, 5, extending through one of the heads of the cylinder, as the head, 2ª, which is provided with a suitable stuffing box, 6, of any desired construction, to prevent leakage. In this instance the hub of the piston is provided with the valve chamber, indicated at 11, provided with oppositely disposed valve seats, indicated at 13 and 14, to engage oppositely disposed valves, of which the suction valve, 40, is adapted to engage the valve seat, 13, and the air inlet valve, 41, is adapted to engage the valve seat, 14. For the purpose of operating these valves, we preferably employ a valve actuating sleeve, 20, extending through the head, 2, of the cylinder, which is provided with a suitable stuffing box, 6ª, surrounding the sleeve, 20, and said sleeve also extends coaxially through the piston hub and through the hollow piston rod, 5, as shown, and through the valves, 40, 41. These valves are provided with yielding means normally tending to seat them, and with means for making a tight joint with the valve sleeve, while permitting a slight movement of the sleeve through the valves, and the valve sleeve is provided with means for engaging the valves and moving them in a direction to open. We prefer to form the valves, 40 and 41, of molded rubber, and to provide them with central apertures, which will fit the valve sleeve sufficiently tightly to form an air tight joint, while permitting the necessary movement of the valve sleeve therethrough. We also prefer to provide, between the valves, 40 and 41, suitable spring washers, indicated at 50, for the purpose of yieldingly pressing the valves in opposite direction, tending to seat them. The valve sleeve, 20, is provided with a collar, 40ª, in position to engage the valve, 40, and open it when the valve sleeve is moved in one direction, and a similar collar, 41ª, for engaging the valve, 41, and moving it in a direction to open it when the valve sleeve is moved in the opposite direction. In the form of valve mechanism illustrated in Figs. 2, 4 and 5, the interior of the valve sleeve is in communication with the atmosphere at one or both ends. In this instance the hollow piston rod, 5, is provided at its outer end with a cap, 8, having a lug, 9, for attaching it to the part to be operated, said cap being provided with an air inlet aperture, 10, communicating with the interior of the sleeve. The opposite end of the sleeve, 20, is also shown provided with a cap, 21, provided with a lug, 22, for connecting it with the operator operated part, and this cap, 21, is also shown provided with an air inlet aperture, 23, also communicating with the interior of the sleeve. Obviously, either one or both of these apertures may be employed. The sleeve, 20, is also provided with lateral openings, 24, communicating with an annular space between the sleeve and the piston rod, 5, and communicating with the interior of the valve chamber, 11, when the valve, 41, is opened, and said valve chamber is provided with a port, or ports, 34, communicating with the cylinder in rear of the piston (at the right in Figs. 2 and 4), and with longitudinal ports indicated at 35, arranged in the piston hub around the sleeve, 20, for establishing communication between the valve chamber, 11, and the interior of the cylinder forward of the piston (at the left in Figs. 2 and 4) when the suction valve 40, is opened. The valve actuating sleeve, 20, is operatively connected with an operator operated part, in this instance with a foot lever, indicated at 88, by means of a link, 89, and means are provided for normally holding the valve actuating sleeve in such position when the parts are in normal or "off" position, that the air inlet valve, 41, will be closed and the suction valve, 40, will be opened, as shown in Fig. 2. In this instance we have shown a coil spring, 15, interposed between a collar, 16, on the interior of the hollow piston rod, and a collar, 17, on the exterior of the valve actuating sleeve for accomplishing this purpose, but any other suitable means may also be employed. The valve sleeve is also operatively connected with the piston by means permitting lost motion, and for this purpose we have shown in this instance, a collar, 25, on the end of the sleeve, 20, within a recess in the cap, 8, secured to the hollow piston rod and adapted to engage the end of the piston rod when moved in a forwardly direction (to the left in Fig. 2), the sleeve being adapted to engage the end of the adjustable cap, held by a set screw, 8ª, when moved in the opposite direction to limit the opening of the suction valve, 40, and thus restricting the flow of air admitted into the intake manifold in which case the employment of a special restricting valve, (as shown at 166 in Fig. 7) or other restricting means in the suction pipe, 62, may be dispensed with. This provides a limited amount of movement between the sleeve and piston, sufficient to permit the operation of the valve mechanism, and as hereinafter explained, will permit the operator to add his physical force to that exerted by the actuator when desired, or to operate the piston of the actuator and the brake mechanism connected therewith in case of failure of power.

In this instance the interior of the cylinder, 1, forward of the piston (at the left in Fig. 2) is directly connected with the source of suction at all times. In this instance this connection is effected by means of a suction pipe, 62, in which is located a check valve, 63, preferably of the kind described in our former application for Letters Patent, filed on the 20th day of October, 1925, and given Serial No. 63,696. The pipe, 62, is preferably connected to the manifold between the ordinary throttle valve, indicated at 64, in dotted lines in Fig. 1, and the engine cylinder. The intake manifold will be provided, as usual, with a carburetor of any usual or preferred type, as indicated at 65. In this instance we have shown in Fig. 1, a conventional representation of brake mechanism, at 70, provided with an operating lever, 71, and retracting spring, 72, the said lever being connected by a link, 73, with the hollow piston rod, 5, of the actuator. It is to be understood that the actuator may be operatively connected with as many brake mechanisms as may be desired and that the brake mechanism may be of any usual or preferred construction.

Assuming that the parts of the apparatus previously described are in the positions indicated in Fig. 2, which represents the normal or "off" position, it will be seen that if the engine is in operation, the air will be exhausted from the actuator cylinder on both sides of the piston, suction valve, 40, being normally held in open position as shown in this figure. In other words, the forward portion of the cylinder (at the left in Fig. 2) is always in communication with the suction means, and when the parts are in normal or "off" position, at which time the valve, 40, is open, the cylinder on both sides of the piston will be connected with the suction means, thereby maintaining the piston normally submerged in vacuum. If it is desired to apply the brakes, the operator will move the brake lever, 88, in the direction of the arrow in Fig. 2, thereby moving the valve sleeve, 20, in the same direction, permitting the suction valve, 40, to close, and thereafter the inlet valve, 41, to open. The air (or other higher pressure fluid) will instantly enter the cylinder in rear of the piston (at the right in Fig. 2) and move the piston forward in the direction of the arrow, with the full force of the apparatus, and as rapidly as desired, according to the extent to which the brake lever, 88, is moved. The forward portion of the cylinder being continuously and at all times connected with the suction means, the forward movement of the piston does not cause any appreciable quantity of air to be delivered into the intake manifold, and therefore the operation of the engine is not materially affected, and there is no danger of stalling it if idling. The forward movement of the piston will follow the forward movement of the foot lever, 88, as indicated in Fig. 4, thus applying the brakes to the desired extent, and as soon as the movement of the foot lever ceases, the continued movement of the piston will permit the air inlet valve to close and shut off the further admission of air, or other higher pressure fluid, thus holding the brakes applied. Any subsequent movement of the piston in either direction would either open the suction valve, 40, to withdraw any surplus of higher pressure fluid, or open inlet valve, 41, to admit more higher pressure fluid. To release the brakes, the operator has only to release the foot lever slightly, so as to permit the retracting spring, in this instance the spring, 15, to move the sleeve, 20, in a direction opposite to that of the arrows in Figs. 2 and 4, and effecting the opening of the suction valve, 40. This causes an equalization of pressure within the cylinder on opposite faces of the piston, permitting the brakes to release themselves, while the air within the cylinder on both sides of the piston is withdrawn and delivered to the intake manifold, under the control of restricted valve opening, if desired, so as not to interfere with the explosive mixture passing to the engine cylinders. The brakes may at any time be re-applied by another forward movement of the pedal lever. If the foot lever is entirely released, the pressure within the cylinder on opposite sides of the piston will be equalized, and the air previously admitted to effect the operation of the piston will be withdrawn, leaving the piston submerged in vacuum, while the draft of the brakes and their retracting springs, will return the piston to its normal position, the suction valve, 40, remaining open so as to normally maintain the piston submerged in vacuum when the parts are returned to normal or "off" position. When the brakes have been applied in the manner previously described, the operator may, by exerting further pressure on the pedal lever, move the sleeve, 20, forward so as to take up the lost motion between the sleeve and the piston, in this instance by bringing the collar, 25, into engagement with the end of the hollow piston rod, 5, and may then add his physical force to that exerted by the actuator piston in the application of the brakes. In case of failure of power, the operator may directly apply the brakes by his physical force, by pressing forward on the foot lever, so as to take up the lost motion between the valve actuating sleeve, 20, and the piston, and move the piston and the brakes connected therewith, in a direction to apply the brakes, the piston offering only the slightest frictional resistance, the valves being open to properly vent the cylinder.

Figures 7, 8, 9, 10:
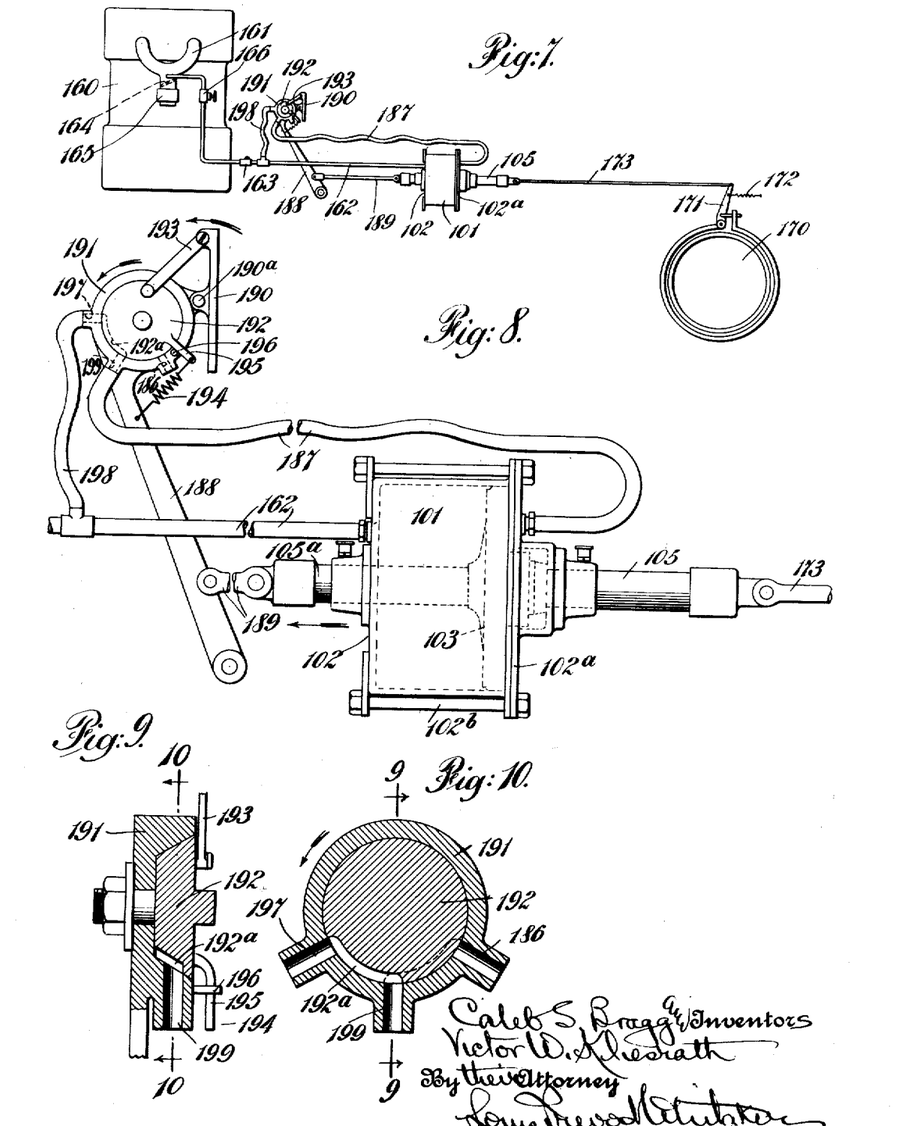
Fig. 7 is a view similar to Fig. 1, illustrating an installation in which the controlling valve mechanism is located entirely outside of the actuator cylinder.
Fig. 8 is an enlarged sectional view of the actuator, the operator operated parts and the controlling valve mechanism.
Fig. 9 is a central, vertical transverse sectional view through the valve mechanism.
Fig. 10 is a longitudinal section on the line 10—10 of Fig. 9.

In Fig. 8 we have illustrated a slight modification of the valve mechanism, in which the communication between the portion of the cylinder forward of the piston, and the valve chamber controlled by the suction valve, is obtained in a slightly different manner. In this instance the valve sleeve, indicated at 120, is closed at its outer end, at the left, and said sleeve is provided with a plug or partition, 126, separating the forward end from the rear end, which is in communication with the atmosphere, in the manner illustrated in Figs. 2 and 4, and the forward portion of the sleeve, 120, is provided with lateral apertures, 127 and 128, one communicating with the interior of the piston hub adjacent to the suction valve seat, 113, which is engaged by the suction valve, 140, while the other aperture communicates with the interior of the cylinder, forward of the piston. The operation of this form of valve mechanism is exactly the same as that previously described.

In Figs. 7, 8, 9 and 10, we have illustrated a different embodiment of our invention, in which the controlling valve mechanism is located outside of the cylinder, and in this particular instance is carried by the pedal lever, which is connected with the piston of the actuator. In this embodiment of our invention, 101 represents the actuator cylinder constructed substantially as hereinbefore described, being closed at both ends by the integral head, 102, and the detachable head, 102ª, secured in position by bolts 102ᵇ. 103 represents a single acting piston, provided with the piston rod, 105, which is in this instance need not be a hollow piston rod, or may be hollow in order to make it lighter, if preferred, and as shown. The piston rod is connected by link, 173, with the lever, 171, of brake mechanism illustrated diagrammatically at 170 in Fig. 7, said lever, 171, being provided with retracting spring, 172, although as before stated, the number and form of brake mechanism, or mechanisms, is unimportant. The piston, 103, is also provided with means for connecting it with the foot lever, 188. In this instance we have shown the piston provided with a second piston rod, 105ª, which extends through the integral head, 102, and is connected to the pedal lever by a link, 198. As indicated in Fig. 7, the cylinder of the actuator, on the side forward of the piston, is connected at all times with the suction means (in this instance the intake manifold, 161, of the internal combustion engine, 160, employed in operating the engine) between the throttle valve, 164, and the engine cylinders by a pipe, 162, in which is located a check valve, 163, and regulating valve, 166. In this instance we have shown the pedal lever, 188, provided with a rocking pedal, indicated at 190, and valve mechanism is supported on the pedal lever, consisting in this instance of a stationary valve casing, 191, within which is mounted a rotary valve, 192, connected by a link, 193, with the rocking pedal, 190, a retracting spring 194, being preferably provided between an arm, 195, on the rotary valve and the pedal lever, and the valve is also provided with a stop, 196, in this instance mounted on the valve casing, 191, in position to be engaged by the arm, 195, for arresting the valve in its normal or "off" position. The valve casing is provided with a suction port, 197, connected with the suction pipe, 162, by a flexible pipe, 198, preferably in rear of the check valve, 163. The valve casing is also provided with a cylindrical port, indicated at 199, which is connected by a flexible pipe, 187, with the actuator cylinder on the opposite side of the piston from the suction pipe, 162. The valve casing is also provided with a third port, indicated at 186, open to the atmosphere. The valve, 192, is provided with a recess, 192ª, so arranged that it will connect the suction port, 197, with the cylinder port, 199, when the valve is in the normal or "off" position, as clearly indicated in Fig. 10, in full lines.

Thus, in the normal position of the parts, the actuator cylinder forward of the piston (at the left in Fig. 8) is always connected with the source of suction by the pipe, 162, and the cylinder in rear of the piston is normally connected with the suction pipe, 162, through the valve recess, 192, as indicated in Figs. 8 and 10. When it is desired to apply the brake mechanism, the operator will apply his foot to the rocking pedal, 190, and rock it in the direction of the arrow in Fig. 8, on its pivotal axis, 190ª, thereby rotating the valve in the direction of the arrows in Figs. 8 and 10, so as to bring the valve recess, 192ª, into the position indicated in dotted lines in Fig. 10, in which it will connect the cylinder port, 199, with the atmosphere, and admit air under atmospheric pressure to the cylinder in rear of the piston, and thereby effecting a forward movement of the piston to apply the brakes, without admitting any material quantity of air to the manifold. The forward movement of the piston will move the foot lever, 188, forward, and the foot of the operator will merely follow this movement under ordinary circumstances, maintaining the rocking pedal in such position as to continue to admit air to the cylinder in rear of the piston. The operator can stop this forward movement at any point by simply rocking his foot in the direction opposite that indicated by the arrow in Fig. 8, so as to close the port, 186, of the valve casing and prevent further admission of air and by reversing the movement of the rocking pedal still further, the valve, 192, can be restored to its normal position so as to connect the cylinder in rear of the piston with the suction port, 197, when the air previously admitted to effect a working stroke of the piston, will be withdrawn under the control of the regulating valve, 166, or other restricting means, and gradually distributed into the manifold in such manner as not to interfere with the operation of the engine, and without danger of stalling it if idling. The instant that the cylinder port, 199, is brought into communication with the suction port, 197, of the valve casing, there will be a reduction of pressure in the cylinder in rear of the piston and a substantial equalization of pressures on opposite sides of the piston permitting the brake mechanism to instantly relieve itself and the draft of the brakes and their restricting springs will return the piston and the valve mechanism and the foot lever to normal position, unless the valve mechanism is operated so as to prevent this. Obviously the operator may partially release and reapply the brakes if desired, by suitably rocking the pedal, 190, and when he releases the pedal altogether, it will be returned to its normal position by the spring, 194, permitting the draft of the brakes and the retracting springs therefor to restore the parts to normal or "off" position, as before stated.

It will also be noted that the operator can apply his physical force to the brake pedal lever, 188, if desired for the purpose of adding it to the power exerted by the actuator piston, and may also operate the actuator piston and the brakes connected therewith entirely by his physical force in case of failure of power, by rocking the pedal, 190, in the usual manner before described, so as to connect the cylinder port, 199, with the atmospheric port, 186, and exerting pressure to force the pedal lever downward, as the valve mechanism will be thereby brought into such a position that the operator will only have to overcome the frictional resistance of the piston in order to apply his physical force to the brake mechanism. Obviously the atmospheric port, 186, might be connected with a source of any other higher pressure fluid if desired.

It will be seen that in this embodiment of our invention, also, the single acting piston is submerged in vacuum, and can be actuated to produce a power stroke without admitting any appreciable quantity of air to the intake manifold and can be permitted to be moved rearwardly to normal position by the draft of the brake mechanism and its retracting spring, or springs, without admitting air or other higher pressure fluid to the cylinder forward of the piston, the air admitted in rear of the piston for the effecting of the working stroke thereof, being gradually withdrawn from the cylinder and delivered to the manifold under the control of the regulating valve or other restricting means. In other words, the portion of the cylinder forward of the piston is at all times connected with the source of suction, the piston is normally submerged in vacuum, and its operative strokes are effected by merely admitting air or other higher pressure fluid into the cylinder in rear of the piston and withdrawing it therefrom.

It will be understood from the foregoing description that, should the power fail for any reason, and the operator actuates the foot lever or other operator operated device, the valves will be moved to such position as to vent the cylinder, and thus permit the piston to be freely moved by the operator operated part.

It is also to be understood that the actuator, when used on an automotive vehicle, is not affected or operated by the sudden failure of the source of suction or by the sudden increase in rarefication at the source of suction, or by any variations in the degree of rarefication effected by the source of suction.

What we claim and desire to secure by Letters Patent is:—

1. In a power actuator, the combination with a cylinder closed at both ends, a single acting piston in the cylinder, and suction means connected with the cylinder on one side of the piston, of means for connecting the cylinder on the opposite side of the piston with the suction means, when the piston is in normal or off position, and for disconnecting the cylinder on one side of the piston only, from the suction means and admitting a fluid under higher pressure thereto, to effect a movement of the piston in one direction and for withdrawing said higher pressure fluid and reestablishing the connection of the said portion of the cylinder with the suction means, to permit the piston to be moved in a reverse direction.

2. In a power actuator, the combination with a cylinder closed at both ends, a single acting piston in the cylinder, and suction means connected with the cylinder on one side of the piston, of means for connecting the cylinder on the other side of the piston with the said suction means, by a restricted passage when the piston is in normal or off position, and for disconnecting said portion of the cylinder from the suction means and admitting a fluid under higher pressure thereto, to effect a movement of the piston in one direction, and for withdrawing said higher pressure fluid through said restricted passage, to permit the piston to be moved in the reverse direction.

3. In a power actuator, the combination with a cylinder closed at both ends, a single acting piston in the cylinder, suction means for said cylinder, and an inlet for supplying higher pressure fluid, of reversing valve mechanism constructed to connect the cylinder on both sides of the piston with the suction means when the valve mechanism is in neutral position and when moved in a direction to effect the power stroke of the piston, to connect said higher pressure fluid inlet with the cylinder on one side of the piston while maintaining the connection between the cylinder on the other side of the piston with the suction means.

4. In a power actuator, the combination with a cylinder closed at both ends, a single acting piston in the cylinder, suction means for said cylinder, and an inlet for supplying higher pressure fluid, of reversing valve mechanism constructed to connect the cylinder on both sides of the piston with the suction means when the valve mechanism is in netural position and when moved in a direction to effect the power stroke of the piston, to connect said higher pressure fluid inlet with the cylinder on one side of the piston while maintaining the connection between the cylinder on the other side of the piston with the suction means, and means for maintaining the valve mechanism in neutral position when the piston is in off position.

5. In a power actuator, the combination with a cylinder closed at both ends, a single acting piston in the cylinder, suction means for said cylinder, connected to the cylinder on one side of the piston at all times, and an inlet for higher pressure fluid, of reversing valve mechanism constructed to connect the cylinder on the other side of the piston with said suction means when the valve mechanism is in neutral position, and to disconnect the cylinder on said other side of the piston from said suction means, and connect it with said higher pressure fluid inlet to effect a power stroke of the piston.

6. In a power actuator, the combination with a cylinder closed at both ends, a single acting piston in the cylinder, suction means for said cylinder connected to the cylinder on one side of the piston at all times, and an inlet for higher pressure fluid, of reversing valve mechanism constructed to connect the cylinder on the other side of the piston with said suction means, by a restricted passage, when the valve mechanism is in neutral position, and to disconnect the cylinder on said other side of the piston from said suction means, and connect it with said higher pressure fluid inlet, to effect the power stroke of the piston.

7. In a power actuator, the combination with a cylinder closed at both ends, a single acting piston in the cylinder, normally maintained submerged in partial vacuum, means for admitting air at atmospheric pressure to the cylinder on one side of the piston only, and withdrawing it therefrom, an operator operated part for controlling said means, and connections between the operator operated part and the piston, whereby the physical power of the operator may be applied to the piston in addition to the power of the actuator or in case of failure of power.

8. In a power actuator, the combination with a cylinder closed at both ends, a single acting piston in the cylinder, normally submerged in partial vacuum, of controlling valve mechanism for placing the cylinder on one side only of the piston, in communication with the atmosphere, to effect a power stroke of the piston and for withdrawing said air therefrom to permit the return movement of the piston, an operator operated part connected with said valve mechanism, and connections between the operator operated part and said piston, whereby the physical power of the operator may be applied to the piston in addition to the power of the actuator, or in case of failure of power, the cylinder will be vented by said valve mechanism and the movement of the piston may be effected by the operator operated part.

9. In a power actuator, the combination with a cylinder closed at both ends, a single acting piston in the cylinder, suction means for said cylinder, connected to the cylinder on one side of the piston at all times, and an inlet for higher pressure fluid, of reversing valve mechanism constructed to connect the cylinder on the other side of the piston with said suction means when the valve mechanism is in neutral position, and to disconnect the cylinder on said other side of the piston from said suction means, and connect it with said higher pressure fluid inlet to effect a power stroke of the piston, an operator operated part connected with said reversing valve mechanism and connections between said operator operated part and said piston providing a sufficient amount of lost motion to effect the operation of said valve mechanism, whereby the physical power of the operator may be applied to the piston in addition to the power of the actuator, or in case of failure of power, the operator operated part may be moved to effect the operation of the valve mechanism into position to vent the cylinder and permit the piston to be operated by said operator operated part.

10. In a power actuator, the combination with a cylinder, closed at both ends, a single acting piston in the cylinder, and suction means for the cylinder, said piston being normally maintained submerged in vacuum, of reversing valve mechanism constructed to admit higher pressure fluid to the cylinder on one side of the piston to effect a working stroke thereof, and to establish communication between the portions of the cylinder on opposite sides of the piston, to effect an equalization of pressures within the cylinder on opposite sides of the piston to permit the return movement of the piston and to withdraw the higher pressure fluid previously admitted to produce a power stroke.

11. In a power actuator, the combination with a cylinder closed at both ends, a single acting piston in the cylinder, suction means for the cylinder, connected to the cylinder on one side of the piston at all times, of reversing valve mechanism constructed to admit higher pressure fluid to the cylinder on the opposite side of the piston, to effect a working stroke thereof, and to establish communication between the portions of the cylinder on opposite sides of the piston, to effect an equalization of pressure within the cylinder on opposite sides of the piston to permit the return movement of the piston and to withdraw the higher pressure fluid previously admitted to produce a power stroke.

12. In a power actuator, the combination with a cylinder closed at both ends, a single acting piston in the cylinder, and suction means for the cylinder, said piston being normally maintained submerged in vacuum, of reversing valve mechanism constructed to admit higher presure fluid to the cylinder on one side of the piston to effect a working stroke thereof, and to establish communication between the portions of the cylinder on opposite sides of the piston, to effect an equalization of pressures within the cylinder on opposite sides of the piston to permit the return movement of the piston and to withdraw the higher pressure fluid previously admitted to produce a power stroke, and means for maintaining the reversing valve mechanism in position to connect the portions of the cylinder on both sides of the piston with each other and with the suction means when the piston is in normal or off position.

13. In a power actuator, the combination with a cylinder closed at both ends, a single acting piston in the cylinder, and suction means for the cylinder, said piston being normally maintained submerged in vacuum, of reversing valve mechanism constructed to admit higher pressure fluid to the cylinder on one side of the piston to effect a working stroke thereof, and to establish communication between the portions of the cylinder on opposite sides of the piston to effect an equalization of pressures within the cylinder on opposite sides of the piston to permit the return movement of the piston and to withdraw the higher pressure fluid previously admitted to produce a power stroke, and means for maintaining the reversing valve mechanism in position to connect the portions of the cylinder on both sides of the piston with each other and with the suction means when the piston is in normal or off position, an operator operated part connected with the valve mechanism, and connections between the operator operated part and the piston.

14. In a power actuator, the combination with a cylinder closed at both ends, a single acting piston in the cylinder, of reversing valve mechanism, a suction pipe connected to the cylinder on one side of the piston independently of the valve mechanism, said valve mechanism being constructed to connect the other side of the piston alternately with the suction pipe and with a source of higher pressure, and operator operated means connected with said valve mechanism.

15. In a power actuator, the combination with a cylinder closed at both ends, a single acting piston in the cylinder, of reversing valve mechanism, a suction pipe connected to the cylinder on one side of the piston independently of the valve mechanism, said valve mechanism being constructed to connect the other side of the piston alternately with the suction pipe and with a source of higher pressure, operator operated means connected with the valve mechanism and connections from said operator operated means to the piston, providing for a sufficient amount of lost motion to permit of the operation of the valve mechanism, whereby the operator may add his physical force to that of the actuator and in case of failure of power, may move said operator operated part to operate the valve mechanism so as to vent the cylinder and may then positively operate the piston by his physical force.

16. In a power actuator, the combination with a cylinder closed at both ends, a single acting piston in the cylinder, and suction means for the cylinder, of a suction pipe for connecting the suction means with the cylinder on one side of the piston, valve mechanism located in the piston and constructed to establish communication between the portions of the cylinder on opposite sides of the piston, and provided with means for admitting higher pressure fluid to that portion of the cylinder on the opposite side of the piston from the portion connected with the suction pipe.

17. In a power actuator, the combination with a cylinder closed at both ends, a single acting piston in the cylinder, and suction means for the cylinder, of a suction pipe connecting said suction means with the cylinder on one side of the piston, reversing valve mechanism in the piston constructed to establish communication between the portions of the cylinder on opposite sides of the piston when the valve mechanism is in neutral position, means for supplying higher pressure fluid to the valve mechanism, said valve mechanism being constructed to disconnect the portions of the cylinder on the opposite sides of the piston from each other and admit higher pressure fluid to that portion of the cylinder on the opposite side of the piston from the portion connected with the suction pipe, and operator operated means connected with said valve mechanism.

18. In a power actuator, the combination with a cylinder closed at both ends, a single acting piston in the cylinder, and suction means for the cylinder, of a suction pipe connecting said suction means with the cylinder on one side of the piston, reversing valve mechanism in the piston constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and to admit higher pressure fluid to that portion of the cylinder only on the opposite side of the piston from the portion to which the suction pipe is connected, operator operated means, and connections therefrom to said valve mechanism.

19. In a power actuator, the combination with a cylinder closed at both ends, a single acting piston in the cylinder, and suction means for the cylinder, of a suction pipe connecting said suction means with the cylinder on one side of the piston, reversing valve mechanism in the piston constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and to admit higher pressure fluid to that portion of the cylinder only on the opposite side of the piston from the portion to which the suction pipe is connected, operator operated means, and connections therefrom to said valve mechanism, means for holding the valve mechanism in said neutral position when the piston is in the normal or off position.

20. In a power actuator, the combination with a cylinder closed at both ends, a single acting piston in the cylinder, and suction means for the cylinder, of a suction pipe connecting said suction means with the cylinder on one side of the piston, reversing valve mechanism in the piston constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and to admit higher pressure fluid to that portion of the cylinder only on the opposite side of the piston from the portion to which the suction pipe is connected, operator operated means, connections therefrom to said valve mechanism, and means for connecting the operator operated means with the piston, providing lost motion sufficient to insure the operation of the valve mechanism.

21. In a power actuator, the combination with a cylinder closed at both ends, a single acting piston in the cylinder, and suction means for the cylinder, of a suction pipe connecting said suction means with the cylinder on one side of the piston, reversing valve mechanism in the piston construction to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and to admit higher pressure fluid to that portion of the cylinder only on the opposite side of the piston from the portion to which the suction pipe is connected, operator operated means, connections therefrom to said valve mechanism, means for holding the valve mechanism in said neutral position when the piston is in normal or off position, and means for connecting the operator operated means with the piston, providing lost motion sufficient to insure the operation of the valve mechanism.

22. In an automotive vehicle provided with an internal combustion engine having a suction passage between the throttle valve and the cylinder of the engine, and brake mechanism for the vehicle, of a power actuator comprising a cylinder closed at both ends, a single acting piston in the cylinder, connections from said piston to the brake mechanism, means for connecting the cylinder on both sides of the piston with the suction passage of the engine when the actuator piston is in its normal or off position, and disconnecting the cylinder in rear of the piston from said suction passage and admitting higher pressure fluid to effect the application of the brake mechanism, and for reestablishing the connections between the cylinder in rear of the piston and said suction passage to permit the brake mechanism to relieve itself and the piston to be returned to normal position.

23. In an automotive vehicle provided with an internal combustion engine having a suction passage between the throttle valve and the cylinder of the engine, and brake mechanism for the vehicle, of a power actuator comprising a cylinder closed at both ends, a single acting piston in the cylinder, connections from said piston to the brake mechanism, a suction pipe connecting said suction passage with the cylinder forward of the piston, means for connecting the cylinder in rear of the piston with said suction passage, by a restricted passage, and for disconnecting the cylinder in rear of the piston from the suction passage and admitting higher pressure fluid thereto.

24. In an automotive vehicle provided with an internal combustion engine having a suction passage between the throttle valve and the cylinder of the engine, and brake mechanism for the vehicle, of a power actuator comprising a cylinder closed at both ends, a single acting piston in the cylinder, connections from said piston to the brake mechanism, a suction pipe connecting said suction passage with the actuator cylinder on one side of the piston therein, reversing valve mechanism in the piston, constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and admit higher pressure fluid to the cylinder in rear of the piston, to effect a power stroke of the piston to apply the brake mechanism, and means for holding the valve mechanism in neutral position when the actuator piston is in the normal or off position.

25. In an automotive vehicle provided with an internal combustion engine having a suction passage between the throttle valve and the cylinder of the engine, and brake mechanism for the vehicle, of a power actuator comprising a cylinder closed at both ends, a single acting piston in the cylinder, connections from said piston to the brake mechanism, a suction pipe connecting said suction passage with the actuator cylinder on one side of the piston therein, reversing valve mechanism in the piston constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and admit higher pressure fluid to the cylinder in rear of the piston, to effect a power stroke of the piston to apply the brake mechanism, means for holding the valve mechanism in neutral position when the actuator piston is in the normal or off position, an operator operated part connected with the valve mechanism, and connections from the operator operated part to the actuator piston, providing means for permitting sufficient lost motion to insure the operation of the valve mechanism.

In testimony whereof we affix our signatures.

CALEB S. BRAGG.
VICTOR W. KLIESRATH.

connections from said piston to the brake mechanism, a suction pipe connecting said suction passage with the actuator cylinder on one side of the piston therein, reversing valve mechanism in the piston, constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and admit higher pressure fluid to the cylinder in rear of the piston, to effect a power stroke of the piston to apply the brake mechanism, and means for holding the valve mechanism in neutral position when the actuator piston is in the normal or off position.

25. In an automotive vehicle provided with an internal combustion engine having a suction passage between the throttle valve and the cylinder of the engine, and brake mechanism for the vehicle, of a power actuator comprising a cylinder closed at both ends, a single acting piston in the cylinder, connections from said piston to the brake mechanism, a suction pipe connecting said suction passage with the actuator cylinder on one side of the piston therein, reversing valve mechanism in the piston constructed to provide a restricted communicating passage between the portions of the cylinder on opposite sides of the piston when the valve mechanism is in neutral position, means for supplying higher pressure fluid to the valve mechanism, said valve mechanism being constructed to disconnect the portions of the cylinder on opposite sides of the piston and admit higher pressure fluid to the cylinder in rear of the piston, to effect a power stroke of the piston to apply the brake mechanism, means for holding the valve mechanism in neutral position when the actuator piston is in the normal or off position, an operator operated part connected with the valve mechanism, and connections from the operator operated part to the actuator piston, providing means for permitting sufficient lost motion to insure the operation of the valve mechanism.

In testimony whereof we affix our signatures.

CALEB S. BRAGG.
VICTOR W. KLIESRATH.

DISCLAIMER 1,583,117.—*Caleb S. Bragg*, Palm Beach, Fla, and *Victor W. Kliesrath*, Port Washington, N. Y. POWER ACTUATOR. Patent dated May 4, 1926. Disclaimer filed March 10, 1934, by the assignee, *Bragg-Kliesrath Corporation*.

Hereby disclaims from the scope of each of claims 6, 11 and 14, any device for applying the brakes of automotive vehicles coming within the language of said claim, unless said device is so combined with the throttle controlled portions of the suction passage of an internal combustion engine for propelling the vehicle that air exhausted in the operation of the power applying means of said device is delivered into said throttle controlled portions of said suction passage, and unless said device is capable of operation at any time when the engine is running and is declutched and the throttle valve thereof is in a partially closed or in the idling position.

[*Official Gazette March 27, 1934.*]

DISCLAIMER 1,583,117.—*Caleb S. Bragg*, Palm Beach, Fla., and *Victor W. Kliesrath*, Port Washington, N. Y. POWER ACTUATOR. Patent dated May 4, 1926. Disclaimer filed March 10, 1934, by the assignee, *Bragg-Kliesrath Corporation*.

Hereby disclaims from the scope of each of claims 6, 11 and 14, any device for applying the brakes of automotive vehicles coming within the language of said claim, unless said device is so combined with the throttle controlled portions of the suction passage of an internal combustion engine for propelling the vehicle that air exhausted in the operation of the power applying means of said device is delivered into said throttle controlled portions of said suction passage, and unless said device is capable of operation at any time when the engine is running and is declutched and the throttle valve thereof is in a partially closed or in the idling position.

[*Official Gazette March 27, 1934.*]